W. C. PERKINS.

Assignor to THE NEW HAVEN WIRE GOODS COMPANY.

GRIDIRON.

No. 11,080. Reissued May 27, 1890.

Witnesses
J. F. Shumway
Lillian D. Kelsey

Wm. C. Perkins
Inventor.
By atty.
Earle Seymour

THE NORRIS PETERS CO., PHOTO-LITHO., WASHINGTON, D. C.

UNITED STATES PATENT OFFICE.

WILLIAM C. PERKINS, OF NEW HAVEN, CONNECTICUT, ASSIGNOR TO THE NEW HAVEN WIRE GOODS COMPANY, OF SAME PLACE.

GRIDIRON.

SPECIFICATION forming part of Reissued Letters Patent No. 11,080, dated May 27, 1890.

Original No. 408,136, dated July 30, 1889. Application for reissue filed February 24, 1890. Serial No. 341,538.

*To all whom it may concern:*

Be it known that I, WILLIAM C. PERKINS, of New Haven, in the county of New Haven and State of Connecticut, have invented a new Improvement in Gridirons; and I do hereby declare the following, when taken in connection with accompanying drawings and the letters of reference marked thereon, to be a full, clear, and exact description of the same, and which said drawings constitute part of this specification, and represent, in—

Figure 1:
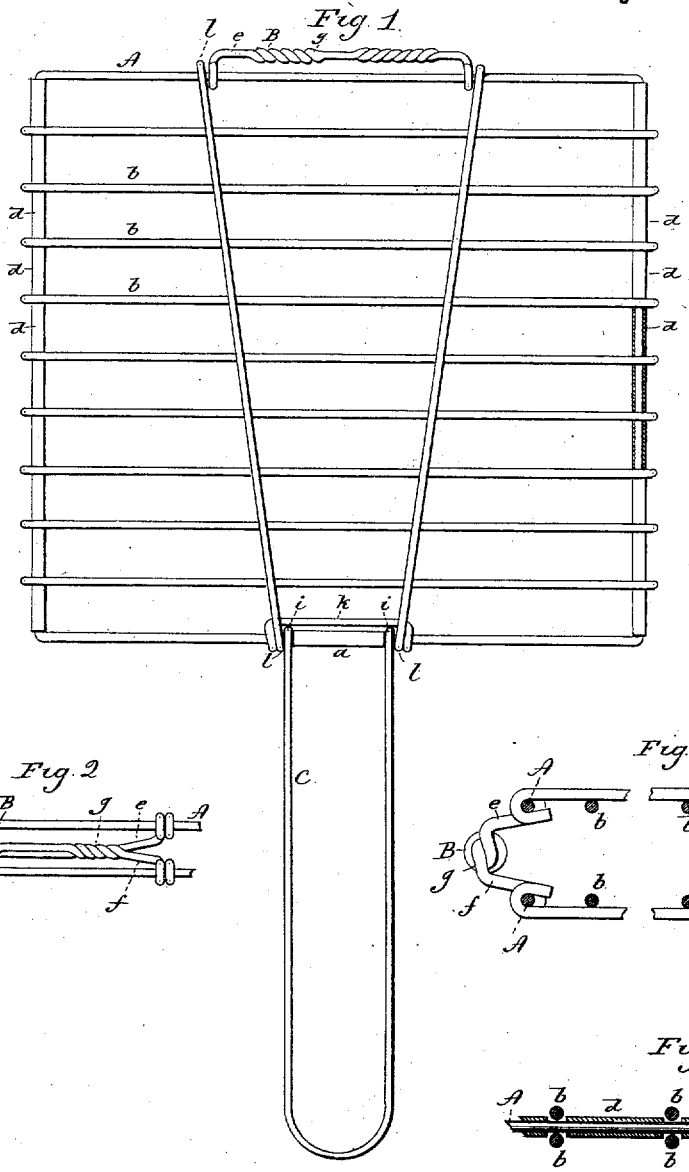
Figure 2:
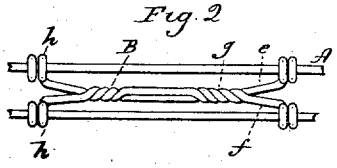
Figure 3:
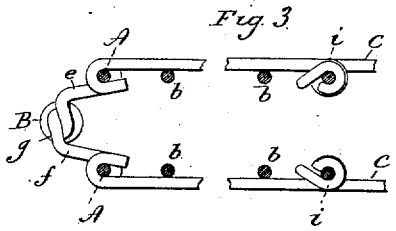
Figure 4:
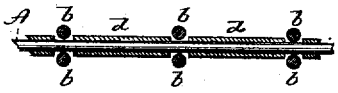

Figure 1, a top view; Fig. 2, a rear view showing the hinge; Fig 3, a transverse section enlarged, broken for convenience of illustration; Fig. 4, a longitudinal section through a portion of one side, showing the clips between the bars.

This invention relates to an improvement in that class of gridirons which are made from wire, and which consist of two frames hinged together at one side, each frame constructed with parallel bars extending across the frame, and each frame provided with a handle extending from the frames on the side opposite the hinge.

In the more general construction of this class of gridirons the frames are hinged together at one side by hooks or loops independent of each other, so as to permit the folding of the frames upon each other, either side out. These hooks are liable to accidental detachment, so as to allow the frames to separate.

The object of the invention is to connect the two parts by a hinge which is not liable to accidental detachment; and the invention consists in the construction, as hereinafter described, and particularly recited in the claim.

Each frame is made from a single piece of wire, bent to the desired form. The ends of the wire may be secured by a tubular clip *a*, as shown, or otherwise. Cross-bars *b* are attached to opposite ends of the frame by bending the ends of the bars around the frame. Upon the frame at both ends, between each bar and between the bars and the adjacent sides of the frame, an open tube *d*, corresponding in length to the distance between the cross-bars, is placed and bent around the frame, as seen in Figs. 1 and 4, which prevents displacement of the bars.

The hinge B consists of two pieces of wire *e f*, twisted about each other midway of their length, as at *g*, to form the body of the hinge, the ends of each part turned from the other, and so as to form two pairs of branches oppositely turned and at substantially right angles to the body, these branches being respectively coiled around the rear bars of the frames; the two branches on the same side of the body being coiled around the one rear bar and the two branches on the opposite side of the body being coiled around the other rear bar of the frame, thus forming a rigid connection between the points of engagement of the two wires forming the hinged body, whereby great firmness is given to the hinged connection and the difficulties before mentioned overcome. Each frame is provided with a handle C, each handle made from a single piece of wire bent into U shape. The two legs of each handle are bent around the side of its frame opposite the hinge, as at *i*, Fig. 3, thence the legs diverge and extend diagonally across the frame and are secured to the hinged side, as at *l*, Fig. 1, outside the ends of the hinge.

To prevent the handle from spreading at the side opposite the hinge, a wire *k* is applied, one end bent around the frame outside one leg of the handle, as at *m*, and extending across the handle. Its other end is bent around the frame outside the other leg of the handle, as at *p*. The clip *a*, before described, for connecting the ends of the wire, stands between the legs of the handle and serves to prevent the legs of the handle from approaching each other.

The parts may be connected, as described, before tinning, so that the tin may act as a solder to securely hold the parts in position.

I have shown and described the cross-bars as extending longitudinally across the frame at right angles to the handle, and this arrangement I prefer, as the handles form an additional support for the bars; but they may be arranged transversely if desired. By this construction it will be seen that the parts are very firmly secured.

The hinging device of this gridiron may be applied to gridirons of usual construction without the bar-separating tubes of the frame, or the bar-separating tubes may be used with the hinging device of other constructions.

I claim—

In a wire gridiron, a pair of frames combined with a hinge made from two pieces of wire joined through the central portion of their length to form the body of the hinge, the two ends of the wires at each end of the said body turned in opposite directions at substantially right angles to the body, so as to form two branches at each end of the body, the said branches on one side of the body bent around one of the rear bars of the gridiron, the corresponding branches on the opposite side of the body bent around the other bar of the gridiron, substantially as described.

WILLIAM C. PERKINS.

Witnesses:
FRED C. EARLE,
LILLIAN D. KELSEY.